(12) United States Patent
Mass et al.

(10) Patent No.: US 6,787,209 B2
(45) Date of Patent: Sep. 7, 2004

(54) WRAPPING MATERIAL WITH A Z-LOCK SYSTEM AND METHODS OF MAKING AND USING THE SAME

(75) Inventors: Nissim Mass, Kibbutz Mishmar HaEmek (IL); Tsafrir Lior, Kibbutz Mishmar HaEmek (IL); Yair Efrati, Kibbutz Mishmar HaEmek (IL); Ilan Asis, Kibbutz Mishmar HaEmek (IL); Hagai Paz, Kibbutz Mishmar HaEmek (IL)

(73) Assignee: Tama Plastic Industry, Kibbutz Mishmar Ha'Emek (IL)

( * ) Notice: Subject to any disclaimer, the term of this patent is extended or adjusted under 35 U.S.C. 154(b) by 0 days.

(21) Appl. No.: 10/326,418

(22) Filed: Dec. 23, 2002

(65) Prior Publication Data

US 2004/0121103 A1 Jun. 24, 2004

(51) Int. Cl.[7] .................................................. B32B 3/04
(52) U.S. Cl. ................... 428/40.1; 53/389.2; 53/396; 221/48; 229/87.01; 229/87.19; 428/41.8; 428/42.1; 428/57; 428/58; 428/121; 428/124; 428/192; 428/194
(58) Field of Search ...................... 428/40.1, 41.8, 428/42.1, 57, 58, 121, 124, 192, 194, 42.2, 42.3, 131; 53/389.2, 396; 229/87.01, 87.19; 221/48; 206/812

(56) References Cited

U.S. PATENT DOCUMENTS

| | | |
|---|---|---|
| 1,960,137 A | 5/1934 | Brown |
| 2,607,711 A | 8/1952 | Hendricks |
| 2,829,073 A | 4/1958 | Williams |
| 2,880,862 A | 4/1959 | Sermattei |
| 3,648,350 A | 3/1972 | Cassidy et al. ............... 29/423 |
| 3,850,786 A | 11/1974 | Jeffries et al. ............... 161/164 |
| 4,562,102 A | 12/1985 | Rabuse et al. ................ 428/43 |
| 5,069,969 A | 12/1991 | McClintock et al. ...... 428/36.5 |
| 5,182,156 A | 1/1993 | Pape et al. .................. 428/130 |
| 5,221,393 A | 6/1993 | Heutschi ..................... 156/191 |
| 5,388,300 A | 2/1995 | Hickey .................. 15/104.002 |
| 5,591,521 A | 1/1997 | Arakawa et al. ............ 428/352 |
| 6,127,014 A | 10/2000 | McKay, Jr. .................. 428/43 |
| 6,182,418 B1 | 2/2001 | McFarland |
| 6,250,495 B1 * | 6/2001 | Bando ......................... 221/48 |

FOREIGN PATENT DOCUMENTS

| | | |
|---|---|---|
| DE | 86 16 467 | 9/1986 |
| EP | 1 044 825 | 10/2000 |
| EP | 1321028 A1 | 6/2003 |
| GB | 2 292 325 | 2/1996 |

* cited by examiner

*Primary Examiner*—Nasser Ahmad
(74) *Attorney, Agent, or Firm*—Morgan & Finnegan, LLP

(57) ABSTRACT

Method and material for wrapping items using a wrapping material made up of separate wrapping portion of a predetermined length. The wrapping portions are attached and released at their ends using a Z-lock system. The Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle.

45 Claims, 6 Drawing Sheets

PRIOR SEPARATION

DURING SEPARATION

WRAPPING MATERIAL WITH A Z-LOCK SYSTEM AND METHODS OF MAKING AND USING THE SAME

FIELD OF THE INVENTION

The present invention relates to wrapping materials that include a Z-lock system to releasably attach separate wrapping portions of a predetermined length that are held together and released at their lateral ends, and methods of using and assembling the wrapping material. Each wrapping portion constitutes at least one complete wrapping cycle. A complete roll of wrapping material comprises several wrapping portions, which are held and released at their lateral ends. Lateral ends of each wrapping portion are formed into a Z-shape to produce the Z-lock system. The Z-lock system holds the wrapping portions together during manufacturing but also easily releases the wrapping portions at the completion of a wrapping cycle. At the completion of the wrapping cycle, the lateral end of at least one wrapping portion when released retains an adhesive layer that seals the item being wrapped.

BACKGROUND OF THE INVENTION

In conventional wrapping operations whenever an item (round, square, or other shaped bale) is wrapped with film supplied from a wound roll, the film must be adhered to the film layer under it in order to securely wrap an item. At present, it is customary to use film that is tacky on one side, and along its entire length to securely wrap the item.

There are a number of existing methods for manufacturing wrapping material to include film with a tacky surface on one side. Some examples include the use of film that can be manufactured by coating with a layer of adhesive, creating electrostatic charges, co-extrusion or other method known in the field of wrapping. However, the disadvantage in all these methods is that when the adhesive is applied on one entire side, the level of adhesion is not high enough since the film must still be allowed to unwind during wrapping of an item. To this end, there are significant limitations on the level of adhesion that can be achieved, making it particularly difficult to securely wrap an item especially at the tail-end of the wrapping material.

Moreover, there are various forces exerted on the wrapping material, which cause the wrapping material, particularly the tail-end, to come loose after an item is wrapped. Shearing and peeling are examples of some of these forces exerted on wrapping material during wrapping. In addition, if the wrapping material is used outdoors, exposure to the extremes of temperature, moisture and especially wind will cause additional problems with adhesion of the tail-end of the wrapping material.

To overcome these problems, methods have been suggested for maintaining a high level of adhesion for the tail-end of wrapping material when wrapping under extreme conditions. One method of addressing the separation problem of the wrapping material is to produce wrap that includes wrapping portions of a fixed length having very strong adhesive qualities at needed locations along the wrapping material. Although this type of wrapping material tends to have increased adhesive qualities, especially at the tail-end of the wrapping cycle, problems have been experienced with the portions of the wrap sticking to each other when wound onto rolls during the manufacturing process.

SUMMARY OF THE INVENTION

With the foregoing in mind, the methods and material of the present invention provide a solution to the problems noted above in the prior art.

In accordance with an aspect of the present invention, the inventive wrapping material uses an adhesive and at least one releasable layer that covers and protects the adhesive while the wrapping material is on a roll. The releasable layer can be used to prevent different wrapping layers from sticking to each other during the manufacturing process. However, when the wrapping material is unwound, the releasable layer will peel away from the adhesive layer at the end of a wrapping cycle. More specifically, when a wrapping portion of wrap is unwound the releasable layer peels away and completely separates from the adhesive layer. The peeling of the protective layer exposes the adhesive layer for sealing the item being wrapped at the completion of a wrapping cycle. Additionally, the releasable layer remains adhered harmlessly to the continuation of the wrapping material still on the roll for the next wrapping application or cycle. In this way, the wrapping portions that remain on the roll are always protected from the adhesives used in the wrapping process, no matter what the diameter of the roll.

In accordance with a further aspect of the present invention, a method is provided which includes the use of wrapping portions of a predetermined length, wherein each portion has an adhesive layer at a lateral end for gluing and securing the tail-end of the wrapping portion.

In accordance with a further aspect of the present invention, the method is provided which includes connecting wrapping portions using a Z-lock, which facilitates the attachment/connection of two different wrapping portions using strong glue while still allowing easy peeling and separation of the Z-lock at the desired time in a wrapping cycle.

In accordance with a further aspect of the present invention, a method is provided which includes connecting wrapping portions using a Z-lock that includes the use of at least one laminate portion.

In accordance with a further aspect of the present invention, a laminate with at least one adhesive is placed on a wrapping portion at the tail-end of the material after being folded back into a V-fold. The tail-end of another wrapping portion is then laid on top of the V-fold to create the Z-lock. The laminate can then be separated between a releasable layer and an adhesive layer by using a peeling action at the end of the wrapping cycle.

In accordance with another aspect of the invention, the wrapping material includes a Z-lock with wrapping portions that terminate exactly even with the end of an adhesive layer.

In accordance with another aspect of the invention, a method is provided which includes stopping a roll of wrapping material while the element being wrapped continues to move. As a result, the tail-end of a wrapping portion continues to be pulled in the direction of the item being wrapped putting pressure on the Z-lock. As pressure continues to be exerted on the Z lock, the Z-lock separates as the releasable layer peels away from the adhesive layer. The adhesive layer, which is located at the end of the portion, is exposed only at the moment the adhesive layer meets the item being wrapped at the completion of the wrapping cycle.

In accordance with a further aspect of the invention, the releasable layer remains at the end of the portion of wrapping material still on the roll. This releasable layer serves to thicken the beginning of the next portion and improves the feeding of the next portion into a baler, or other type of wrapping equipment.

In accordance with another aspect of the invention, the laminate used in the Z-lock includes several different layers of material.

In accordance with another aspect of the invention, a method is provided which includes lengthening the folds of the Z-lock in order to prevent the possibility of premature separation.

In accordance with another aspect of the invention, the Z-lock includes at least two adhesive areas laterally separated from each other to prevent premature separation.

In accordance with another aspect of the invention, a method is provided which includes the use of double-sided adhesive strips with a lower rate of adhesion on one side of the Z-lock.

DETAILED DESCRIPTION OF THE INVENTION

The material and methods of the present invention will now be discussed with reference to FIGS. 1–12. Like reference numbers and designations in these figures refer to like elements.

Figure 1:
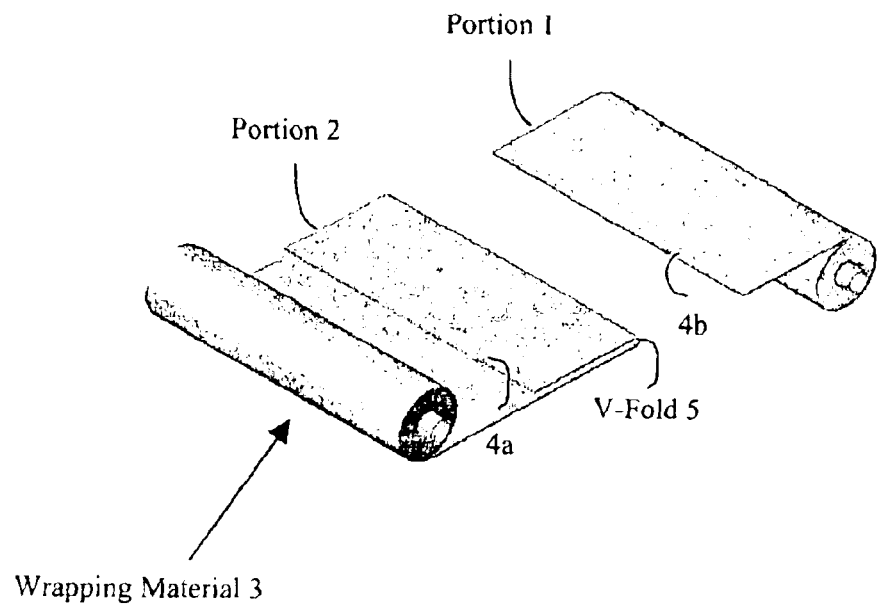
FIG. 1 is a perspective view of the wrapping material in accordance with an embodiment of the present invention.

FIG. 1 is a perspective illustration of the wrapping material in accordance with an embodiment of the present invention. The wrapping material 3, being prepared in FIGS. 1–4, includes at least two wrapping portions 1, 2, with predetermined lengths. The wrapping material 3 can be made from polyolefins, such as polyethylene, or other suitable polymeric material that is approximately 40 to 120 microns thick and 50 to 400 centimeters in width. Additionally, the wrapping material 3 may also be clear or be pigmented. However, the material used for the wrapping portions 1, 2 is in no way limited to the materials discussed above and can include netting or other suitable wrapping material, natural or man-made. The length and width of each wrapping portion 1, 2 should be enough to at least cover the circumference or perimeter of the item (not shown) to be wrapped. Accordingly, the length and width of the wrapping material can vary depending on the size and shape of the item to be wrapped and the wrapping application. Each wrapping portion includes lateral ends 4a, 4b. In FIG. 1, the lateral end 4a of the wrapping portion 2 is folded back on itself to form a V-shaped fold 5.

Figure 2:
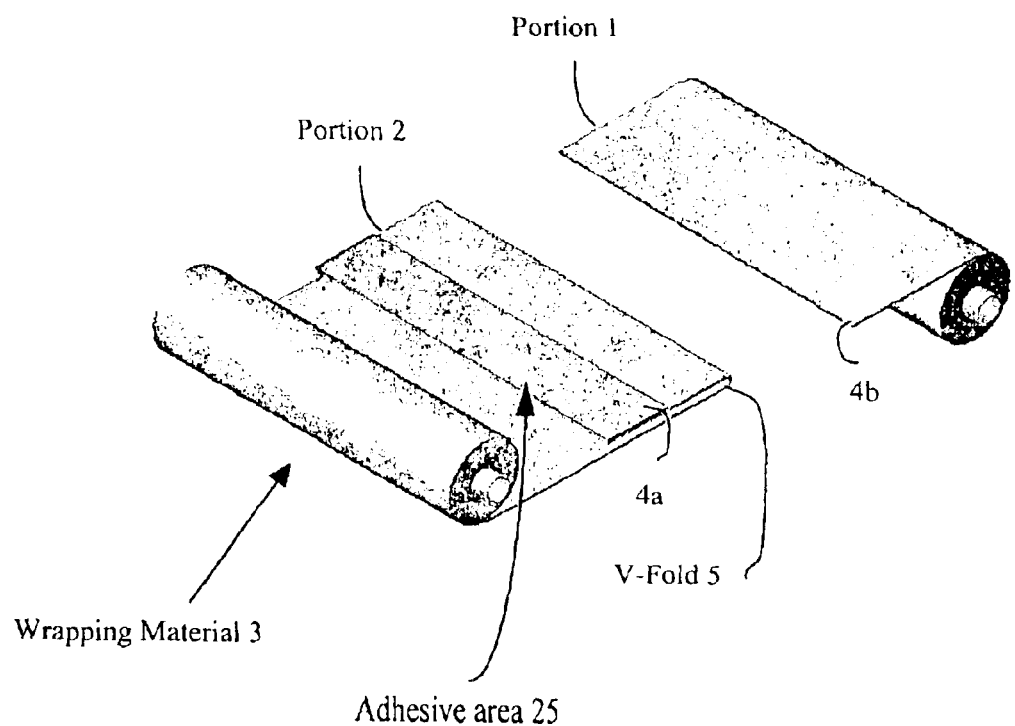
FIG. 2 is another perspective view of the wrapping material in accordance with an embodiment of the present invention.

In FIG. 2, the upper surface of the V-fold 5 includes an adhesive area 25 used for bonding the upper surface of the V-fold 5 to the lateral end 4b of the wrapping portion 1. A releasable layer (not shown) covers at least one surface of the adhesive area 25 at the lateral end of the wrapping portion 2 and is removed to expose an adhesive layer A (not shown) on the surface of the V-fold 5. The adhesive layer A is a high adhesion adhesive for providing permanent bonding of part of the upper surface of the V-fold 5 with the lower surface of an end 4b of another wrapping portion 1, of the wrapping material 3.

Figure 3:
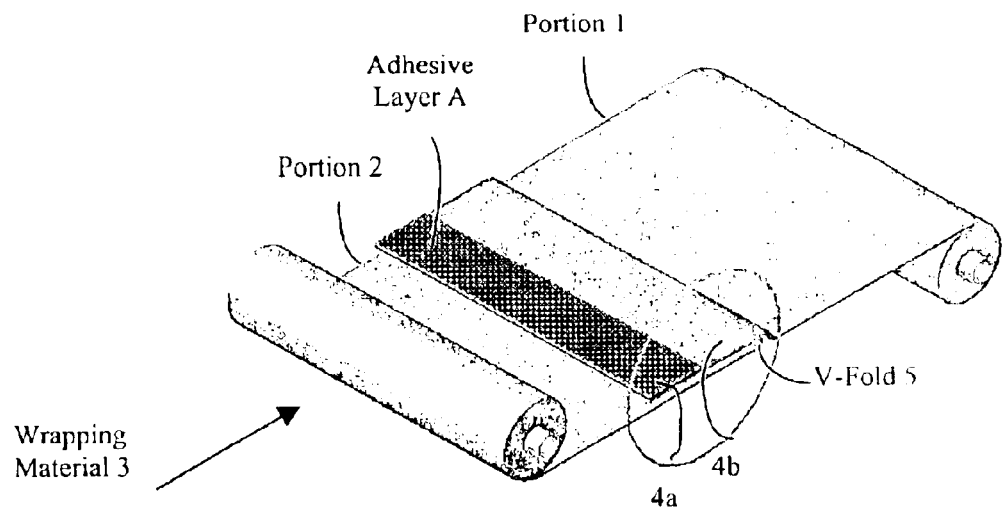
FIG. 3 is a perspective view of the Z-lock in accordance with an embodiment of the present invention.

As seen in FIG. 3, the lateral end 4b of wrapping portion 1 is laid over the upper surface of the adhesive layer A on the lateral end 4a of the wrapping portion 2 for permanent bonding between the adhesive layer A and the lateral end 4b of the wrapping portion 1. The lateral ends 4a and 4b of the wrapping portions 1, 2 terminate at the end of the adhesive layer A.

Figure 4:
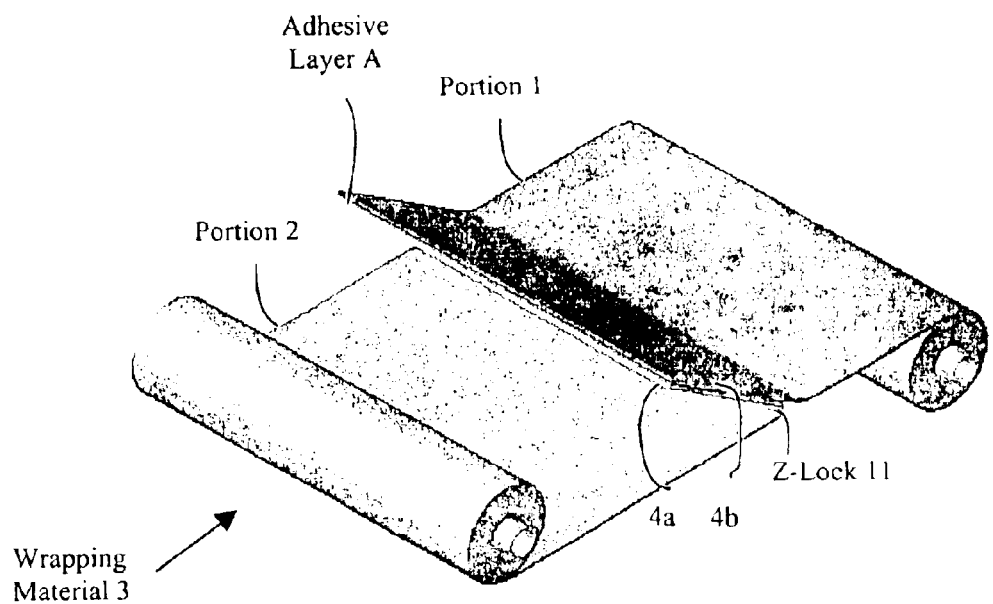
FIG. 4 is another perspective view of Z-lock in accordance with an embodiment of the present invention.

FIG. 4, illustrates an example of the Z-lock system in accordance with an embodiment of the invention. In FIG. 4, the entire Z-shape of the Z-lock system is comprised of the lateral ends 4a and 4b of the wrapping portions 1, 2 and adhesive area 25. More specifically, the Z-shape is formed by folding a lateral end 4a of portion 2 on itself to form the V-shape fold 5. After portion 2 is folded, the lateral end 4b of portion 1 is laid on the top of the V-fold 5 of portion 2. The wrapping portions 1, 2 are adhered to each other using the adhesive layer A of the adhesive area 25 on the upper surface of the V-fold 5. The ends 4a, 4b of the wrapping portions are adhered so there ends 4a, 4b are flush with one another. The addition of portion 1 laid on top of the V-fold 5 of portion 2 is what transforms the V-fold 5 into a Z-lock 11.

In order to successfully wrap an item using the Z-lock system, each portion 1, 2 should terminate exactly even with the end of the adhesive layer A on the lateral ends 4a, 4b of the wrapping portions 1, 2. It is advantageous that the portions 1, 2 be cut exactly. If a wrapping portion 1 is cut so that its length extends beyond the adhesive area 25 of the adhesive portion A, the full benefit of the Z-lock system may not be achieved and it could result in the tail-end of the wrapping portion 1 separating from the item being wrapped. A loose tail-end of the wrapping material can be blown about by the wind and in time cause the wrapping portions 1, 2 to open up after wrapping is complete. Conversely, if the wrapping portions 1, 2 are cut too short, feeding problems can occur since the adhesive area 25 could be partially exposed and stick to rollers or any metal parts of the wrapping equipment while the wrapping material is moved through the equipment during the wrapping process, or stick to itself.

Figure 5:
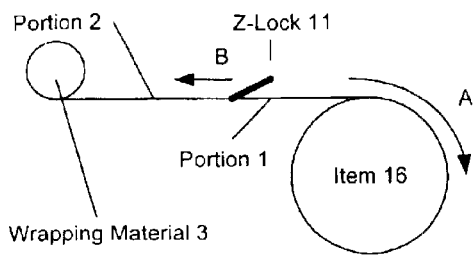
FIGS. 5, 6, 7 and 8 illustrate steps of wrapping an item in accordance with an embodiment of the present invention.
Figure 6:
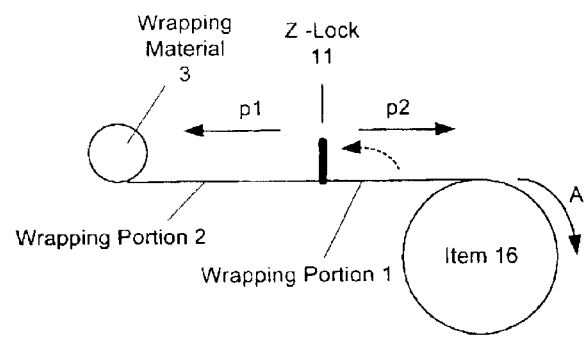

FIGS. 5–8 illustrate a method of wrapping using the Z-lock in accordance with an embodiment of the present invention. FIG. 5 shows a roll of wrapping material 3 having a plurality of releasably attached wrapping portions 1, 2 . . . n on a roll in which adjacent wrapping portions are attached through the inventive Z-lock system 11. By way of example, the wrapping will be carried out on an agricultural baler known in the art for baling hay, cotton or the like (e.g., existing balers and pallet wrapping machines). In FIG. 5, the wrapping portions 1, 2 are fed from the rolled wrapping material 3 and wrapped around the item 16 to be baled in FIG. 5. After a number of turns of the wrap around the item 16 using a predetermined length of a wrapping portion 1, the roll of wrapping material 3 will stop while the element 16 being wrapped continues to turn in direction A. As seen if FIG. 6, the continued movement of the baled item 16 in direction A causes the Z-lock to move to the upright position and pressure p1, p2 to be exerted on the Z-lock 11 in opposite directions.

Figure 7:
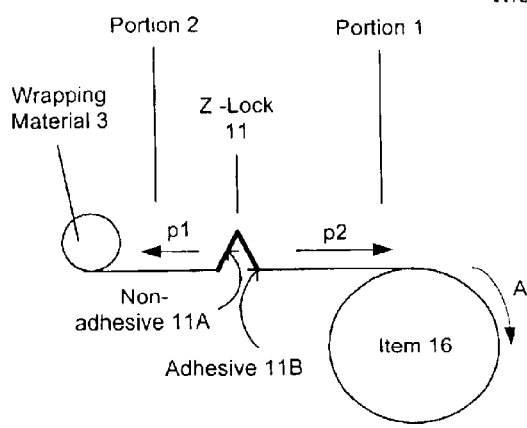
Figure 8:
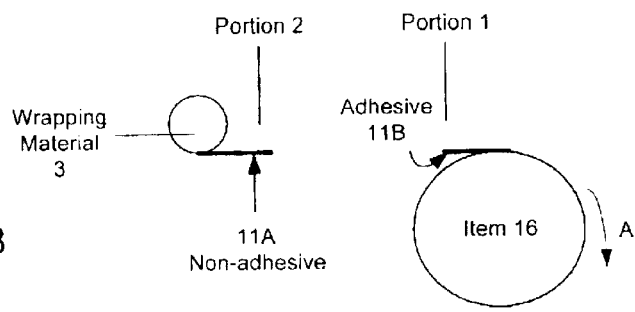

In FIG. 7, the wrapping material roll 3 is stationary, and the item 16 to be baled continues rotating in its clockwise direction A. The increased pressure p1, p2 exerted on the Z-lock 11 connecting the end portions 1, 2 of the wrapping material 3 causes the Z-lock to separate and form a "V" shape having adhesive and non-adhesive layers 11A and 11B. The continued movement of item 16 causes the Z-lock to separate so that a non-adhesive or releasable layer 11A completely peels away from an adhesive layer 11B of the Z-lock 11. Accordingly, the adhesive layer 11B located at the end of wrapping portion 1 is exposed at the moment it meets the element 16 being wrapped at the end of the wrapping cycle, as seen in FIG. 8.

The fact that the adhesive layer is covered by a releasable layer inside the Z-lock 11 until the moment of adhesion makes it possible for all the wrapping portions 1, 2 that make-up the wrapping material 3 (including the Z area) to move smoothly between all the rollers and various parts of the baler during the wrapping process. Additionally, this prevents the adhesive layer 11B in the Z-lock from getting dirty, which would adversely affect the quality of adhesion during wrapping. This is particularly advantageous when working with metal rollers or when working in very dusty conditions. Because of the advantages of the Z-lock 11, the adhesive layer 11B creates a perfect adhesion to the item 16 being wrapped at the end of a wrapping cycle. The wrapping material 3 of the present invention can be fed into unmodified wrapping machinery because the wrapping material 3 is non-adhesive until the Z-lock 11 is separated at the end of a wrapping cycle.

Figure 9:
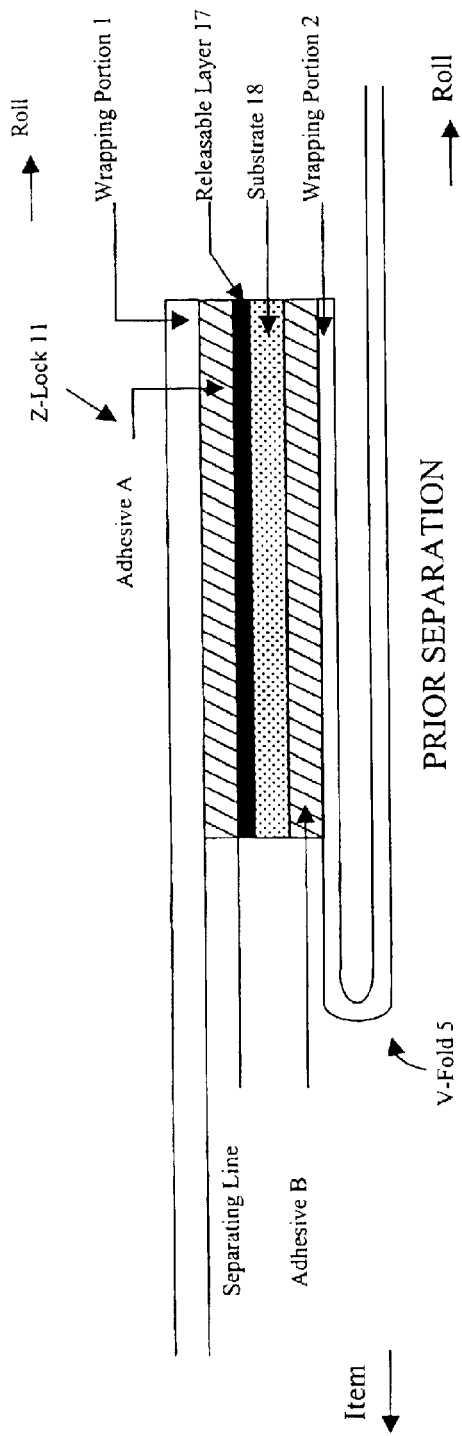
FIGS. 9, 10 and 11 are more detailed illustrations of the different layers of a laminate used for the Z-lock in accordance with an embodiment of the present invention.
Figure 10:
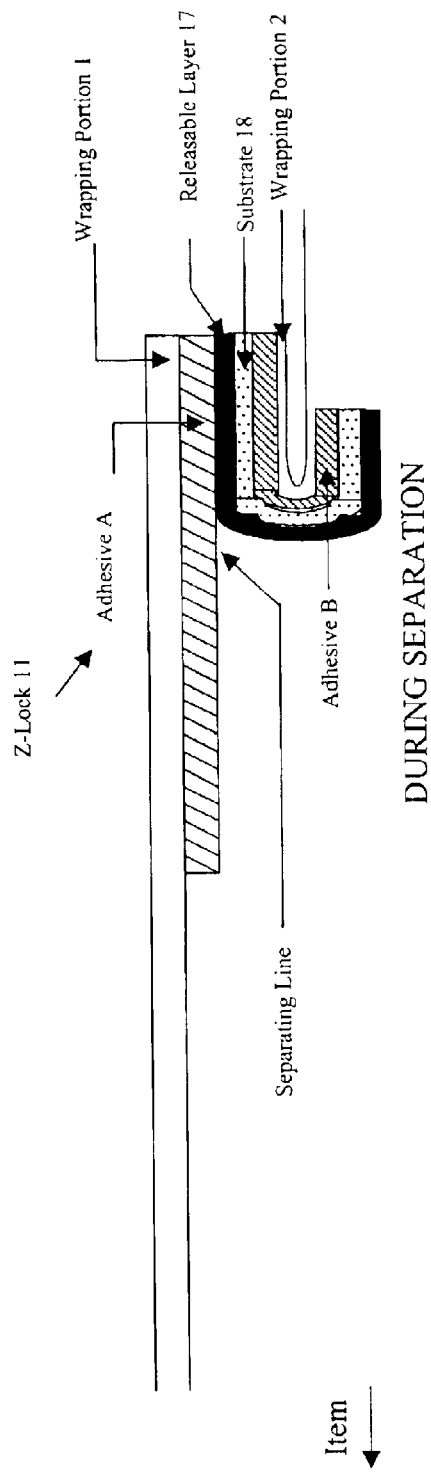
Figure 11:
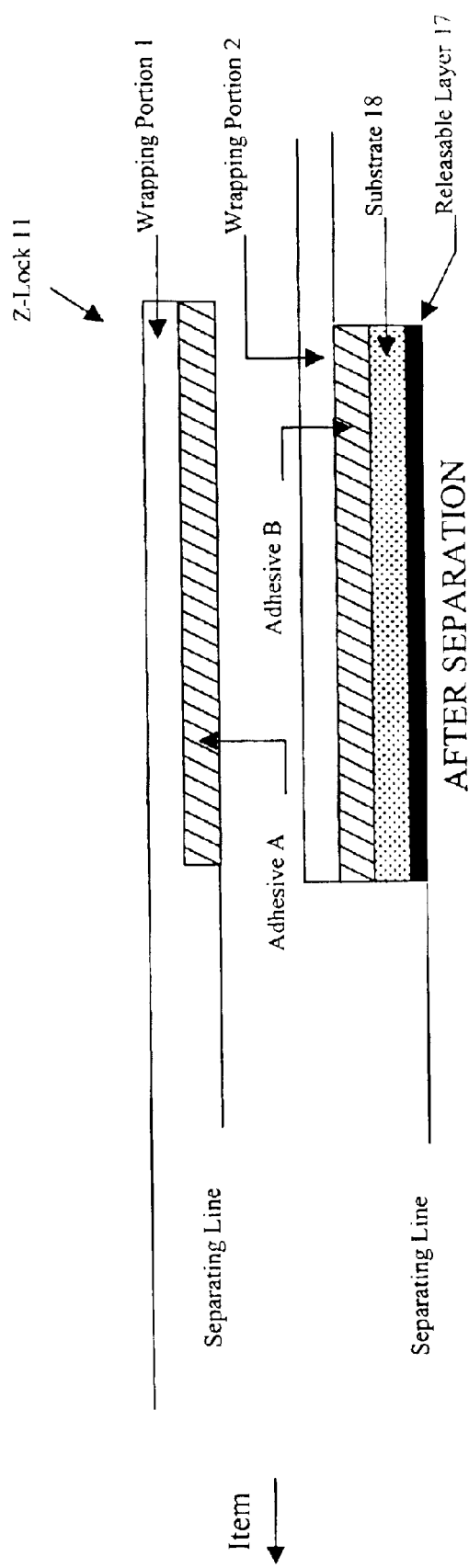

FIGS. 9, 10 and 11 illustrate the use of a laminate material that can be used with the Z-lock 11 in accordance with an embodiment of the invention. In FIG. 9 and by way of example, the Z-lock 11 is comprised of 4 basic layer first and second high adhesive layers A, B; a lower adhesive releasable layer 17; and a substrate layer 18. The first high adhesive layer A has a top surface that is permanently attached to the lower surface of wrapping portion 1 and flush with the end of portion 1 of the wrapping material 3. The lower surface of the adhesive A is then attached to the top surface of a releasable layer 17. The releasable layer 17 can be any suitable material with lowered adhesive characteristics such as but not limited to silicone. The releasable layer 17 is in contact on it lower surface with a substrate layer 18. The substrate 18 can include, but is not limited to, a material such as paper. This substrate layer 18 provides a surface for permanent bonding between at least one surface of the releasable layer 17 (i.e., lower surface) and the second adhesive B of the laminate. Thus, the releasable layer 17 has only one surface (i.e., upper surface) that is of a lowered adhesive characteristic. Accordingly, the boundary between the upper surface of the releasable layer 17 and the lower surface of the first adhesive layer A functions as the separating line of the Z-lock system 11. However, prior to separation, as shown in FIG. 9, the bond between releasable layer 17 and the first adhesive layer A is sufficient to hold wrapping portions 1, 2 together during manufacturing and placement of the wrapping material 3 on a roll.

FIG. 10 shows the peeling away of the releasable layer 17 from the adhesive layer A at the lowered adhesive boundary (separating line) of the laminate material of the Z-lock 11. The peeling away of the releasable layer 17 is accomplished when the roll of wrapping material stops moving and the item to be wrapped continues to move. The continued movement of the item causes pressure to be exerted on the Z-lock 11 of the wrapping material. As the pressure increases, the laminate material of the Z-lock 11 separates at the lowered adhesive boundary between the releasable layer 17 and the adhesive layer A. The peeling or separating of the wrapping portions 1, 2 continue until the adhesive A is completely separated from the releasable layer 17.

FIG. 11 shows the complete separation of the Z-lock between the lower surface of the first adhesive layer A and the releasable layer 17. The adhesive layer A of wrapping portion 1 is exposed at the moment the adhesive layer A meets the item being wrapped at the end of the wrapping cycle. The releasable layer 17 continues to be bonded to the wrapping portion 2 still on the roll at the end of the wrapping cycle of the item. In this way, the releasable layer 17 protects the wrapping portion 2 from prematurely adhering during any subsequent wrapping cycles.

Figure 12:
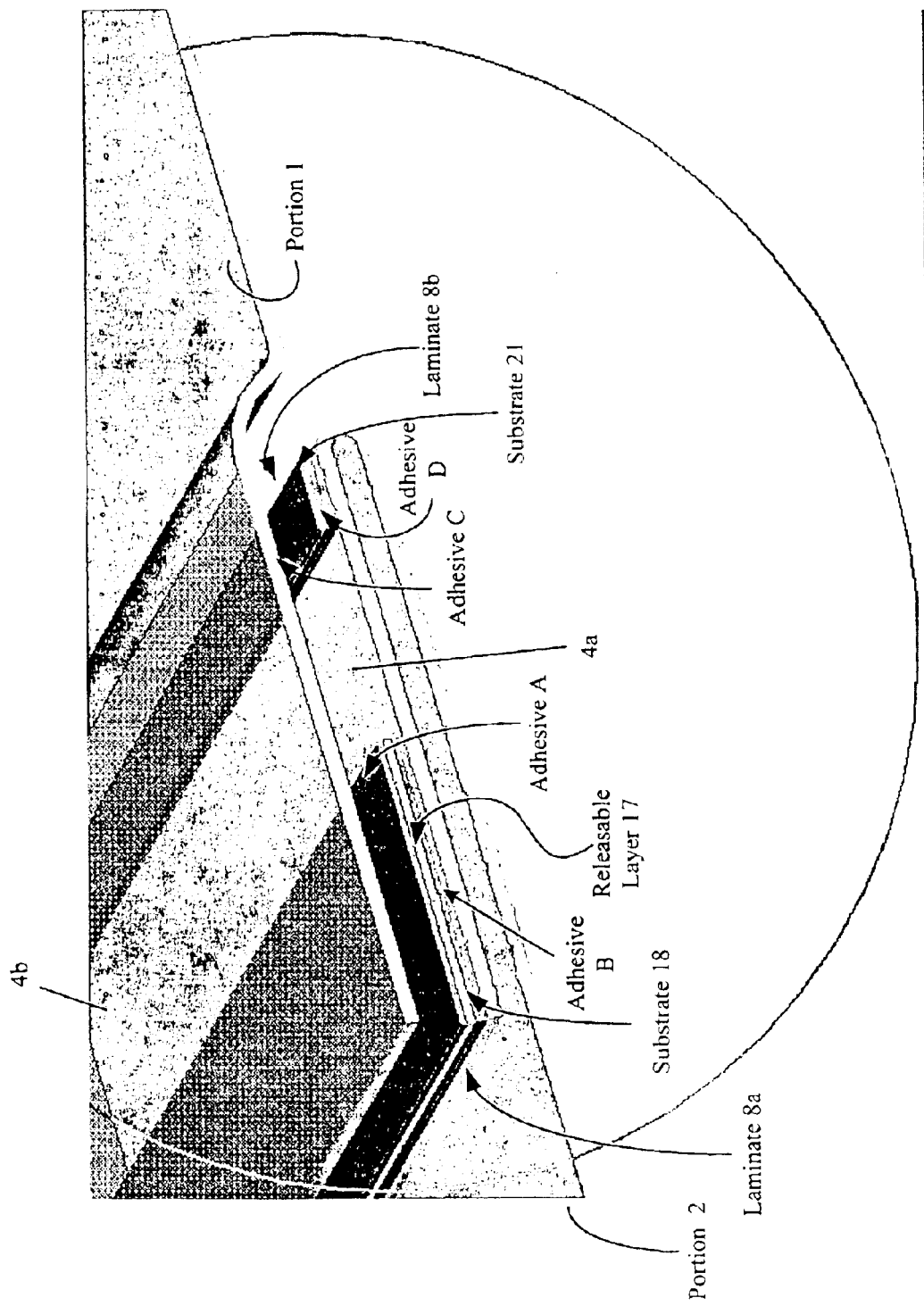
FIG. 12 is a more detailed illustration of the different layers of two laminates used for the Z-lock in accordance with yet another embodiment of the present invention.

In an alternative embodiment, the fold of the Z-lock can be produced at a length longer than the length of a necessary first adhesive area. In this case, a second adhesive area is used to prevent the possibility of premature separation of the Z-lock. FIG. 12 is a more detailed illustration of the Z-lock in accordance with this alternative embodiment. In FIG. 12, the Z-lock includes lateral ends 4a, 4b of the wrapping portions 1, 2 that are held together using two laterally spaced laminate materials 8a, 8b. Laminate material 8a includes several different layers that include, but are not limited to, two adhesive layers A, B, a releasable layer 17, and a substrate layer 18. Similar to the laminate in FIGS. 9, 10 & 11, the laminate material 8a has a releasable layer with a lower surface releasably bonded to the lower surface of the adhesive layer A. Thus, the lower surface of the adhesive layer A and the upper surface of the releasable layer 17 provide the boundary of separation for the Z-lock. The final layer of the laminate 8a is a second adhesive layer B that is bonded on one side to a substrate layer 18 and on the other side to another wrapping portion 2 of the wrapping material 3.

The second laminate material 8b is laterally spaced from the first laminate material 8a to help prevent the lateral ends of the wrapping portions 1, 2 from releasing prematurely during the manufacturing or wrapping process. However, to assist in the release of the wrapping portions 1, 2 at the end of a wrapping cycle, the laminate material 8b is comprised of both a high and low adhesive layer C, D separated by a substrate 21. The high adhesive layer C permanently bonds the laminate material 8b to a wrapping portion 2 while the lower adhesive layer D releases the wrapping portions at the end of a wrapping cycle between the upper surface of the lower adhesive layer D and the lower surface of the substrate 21.

It is contemplated by the invention that the laminate is not limited to the materials or layers noted above and can vary depending on the wrapping application and wrapping equipment used.

It is also contemplated by the present invention that suitable materials for the adhesive layers A, B, C and D include, but not limited to, acrylic or styrene glues having tackiness properties of from 4 to 20 Newtons per the American Standard of Testing Methods (ASTM) D1876-01 "Standard Test Method for Peel Resistance of Adhesives" (T-Peel Test) or per ASTM D3330/D "Peel Adhesion of Pressure-Sensitive Tape." It is contemplated by the invention that the layers of adhesives should be from 20 to 120 microns thick. However, the adhesive layers can vary in type and thickness depending on the wrapping application.

In another embodiment, the integrity of an elongated Z-lock area during production and during wrapping can be preserved by using double-sided adhesive strips with a lower rate of adhesion on one side that are added to the Z-lock.

Additionally, the method described in the above figures allows for the connecting of as many wrapping portions as desired, e.g., 10, 100, 1000, etc., using a strong glue or adhesive while still allowing easy separation at the desired time during a wrapping cycle.

It should be emphasized that wrapping material of the present invention is not limited only to any specific material or specific dimensions, and has applications for preparation of al wrapping material, taking into consideration the desirable qualities of each material and the purposes for which the items are being wrapped.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A wrapping material, comprising:
   a first wrapping portion;
   a second wrapping portion;
   at least one Z-lock portion bonding said first and second wrapping portions at their respective lateral ends for holding together and releasing said first and second portions during a wrapping cycle.

2. The wrapping material of claim 1, wherein said first wrapping portion and second wrapping portion are non-adhesive films.

3. The wrapping material of claim 1, wherein at least one of said wrapping portions is a net wrapping material.

4. The wrapping material of claim 1, wherein said first and second wrapping portions are a predetermined length and width.

5. The wrapping material of claim 1, wherein a Z-lock portion includes at least one high adhesive layer and a releasable layer.

6. The wrapping material of claim 5, wherein the releasable layer is a lowered adhesion adhesive layer.

7. The wrapping material of claims 6, wherein the releasable layer is a silicone layer.

8. The wrapping material of claim 1, wherein the lateral end of said second wrapping portion is folded into a V-shape or V-fold.

9. The wrapping material of claim 8, wherein the lateral end portion of said first wrapping portion is laid on top of and bonded to the V-shape of said second wrapping portion to form said Z-lock portion.

10. The wrapping material of claim 1, wherein the first portion and said second wrapping portions remain adhered at their respective lateral ends during winding on a roll and during the wrapping cycle.

11. The wrapping material of claim 5, wherein said first and second wrapping portions are released at the end of the wrapping cycle at a boundary between said high adhesive layer and said releasable layer.

12. The wrapping material of claim 5, wherein the releasable layer remains adhered to the lateral end of at least one of the wrapping portions at the end of the wrapping cycle.

13. The wrapping material of claim 5 wherein the high adhesive layer remains adhered to the lateral end of at least one of said wrapping portions and to an item being wrapped at the end of the wrapping cycle.

14. The wrapping material of claim 1, wherein said first portion and said second portion have a length and width sufficient to at least cover the circumference of an item being wrapped.

15. A wrapping material, comprising:
    a first wrapping portion;
    a second wrapping portion;
    at least one laminate portion bonding said first or second wrapping portions at their respective lateral ends for holding together and releasing said first and second wrapping portions during a wrapping cycle.

16. The wrapping material of claim 15, wherein said first wrapping portion and second wrapping portion are non-adhesive films.

17. The wrapping material of claim 15, wherein at least one of said wrapping portions is a net wrapping material.

18. The wrapping material of claim 15, wherein said first and second wrapping portions are predetermined length and width.

19. The wrapping material of claim 15, wherein said at least one laminate portion includes at least two high adhesive layers, a substrate layer and a releasable layer.

20. The wrapping material of claim 19, wherein the releasable layer is a lowered adhesion adhesive layer.

21. The wrapping material of claims 20, wherein the releasable layer is a silicone layer.

22. The wrapping material of claim 19, wherein the substrate layer is paper.

23. The wrapping material of claim 19, wherein an upper surface of a first high adhesive layer is bonded to the lateral end of the first wrapping portion and the lower surface of said first high adhesive layer is bonded to an upper surface of said releasable layer.

24. The wrapping material of claim 19, wherein a lower surface of said releasable layer is bonded to an upper surface of said substrate layer and a lower surface of said substrate is bonded to an upper surface of said second high adhesive layer, said second high adhesive layer being bonded to the lateral end of said second wrapping portion.

25. The wrapping material of claim 19, wherein said first and second wrapping portions are released at the end of a wrapping cycle at a boundary between said first high adhesive layer and said releasable layer.

26. The wrapping material of claim 19, wherein the releasable layer remains adhered to the lateral end of said second wrapping portion after separation of said first and second wrapping portions at the end of the wrapping cycle.

27. The wrapping material of claim 19, wherein the first high adhesive layer remains adhered to the lateral end of said first wrapping portion and an item being wrapped at the end of the wrapping cycle.

28. The wrapping material of claim 15, wherein said first wrapping portion and said second wrapping portion have a length and width sufficient to at least cover the circumference of an item being wrapped.

29. The wrapping material of claim 15, further comprising a first and second laminate portion separated laterally on the lateral end of said second wrapping portion.

30. The wrapping material of claim 29, wherein said second laminate portion includes at least a high adhesive layer and lower adhesion adhesive layer separated by a substrate.

31. The wrapping material of claim 30, wherein said second laminate portion separates at a boundary between the lower adhesive layer and substrate at the end of the wrapping cycle.

32. A method of wrapping; comprising:
    wrapping the circumference of an item using a first wrapping portion bonded at a lateral end to a second wrapping portion by at least one Z-lock portion;
    stopping the movement of said first wrapping portion;

continuing the movement of said item;

separating said first portion from said second portion at a low adhesion boundary in said Z-lock portion; and sealing the said item using the lateral end of said first wrapping portion to complete a wrapping cycle of said item, wherein stopping of said first wrapping portion and movement of said item separates said first portion from said second wrapping portion at the end of the wrapping cycle.

33. The method of claim 32, wherein said first wrapping portion and second wrapping portion are non-adhesive films and each is used to complete at least one wrapping cycle.

34. The method of claim 32, wherein at least one of said wrapping portions is a net wrapping material.

35. The method of claim 32, wherein said first and second wrapping portions are a predetermined length and width.

36. The method of claim 32, wherein a the Z-lock portion includes at least one high adhesive layer and a releasable layer.

37. The method of claim 36, wherein the releasable layer is a lowered adhesion adhesive layer.

38. The method of claim 36, wherein the releasable layer is a silicone layer.

39. The method of claim 32, further comprising folded a lateral end of said second wrapping portion into a V-shape prior to joining with said first wrapping portion.

40. The method of claim 39, further comprising lying the lateral portion of said first wrapping portion on top of and bonding to the V-shape of said second wrapping portion to form said Z-lock portion.

41. The method of claim 36, wherein said first and second wrapping portions are separated at a boundary between the high adhesive layer and said releasable layer of the Z-lock portion at the end of the wrapping cycle.

42. The method of claim 32, wherein said first and second wrapping portions have a length and width sufficient to at least cover the circumference of the item being wrapped.

43. The method of claim 36, wherein the high adhesive layer remains adhered to the lateral end of said first wrapping portion and to an item being wrapped at the end of the wrapping cycle.

44. The method of claim 36, wherein the releasable layer remains adhered to the lateral end of said second wrapping portion at the end of the wrapping cycle.

45. A wrapping material, comprising:

a plurality of wrapping portions bonded together at their respective lateral end to form a continuous wrapping material, said respective lateral ends being bonding by a Z-lock portion that holds together and releases said plurality of wrapping portions during a wrapping cycle.

* * * * *

UNITED STATES PATENT AND TRADEMARK OFFICE
CERTIFICATE OF CORRECTION

PATENT NO. : 6,787,209 B2
DATED : September 7, 2004
INVENTOR(S) : Mass et al.

It is certified that error appears in the above-identified patent and that said Letters Patent is hereby corrected as shown below:

Title page, Item [54] and Column 1, line 1,
Title, "WRAPPING" should read -- A WRAPPING --.

Title page,
Item [73], Assignee, "Ha'Emed" should read -- HaEmek --;
Item [57], ABSTRACT,
Line 2, "portion" should read -- portions --;
Line 9, "use" should read -- used --.

Column 3,
Line 22, "of Z-lock" should read, -- of the Z-lock --.

Column 4,
Line 24, "so there" should read, -- so their --;
Line 60, "As seen if" should read, -- As seen in --.

Column 5,
Line 32, "basic layer" should read, -- basic layers: --;
Line 42, "contact on it" should read, -- contact on its --.

Column 6,
Line 53, "but not limited to" should read, -- but are not limited to --.

Column 7,
Line 7, "of al wrapping" should read, -- of all wrapping --;
Line 40, "claims 6" should read, -- claim 6 --;
Line 49, "wherein the first" should read, -- wherein the said first --.

Column 8,
Line 14, "are predetermined" should read, -- are a predetermined --;
Line 21, "claims 20" should read, -- claim 20 --.

Column 9,
Line 18, "wherein a the" should read, -- wherein the --;
Line 25, "folded a" should read, -- folding --.

UNITED STATES PATENT AND TRADEMARK OFFICE
CERTIFICATE OF CORRECTION

PATENT NO. : 6,787,209 B2
DATED : September 7, 2004
INVENTOR(S) : Mass et al.

It is certified that error appears in the above-identified patent and that said Letters Patent is hereby corrected as shown below:

Column 10,
Line 1, "lying" should read -- laying --;
Line 22, "lateral end" should read, -- lateral ends --;
Line 23, "bonding" should read, -- bonded --.

Signed and Sealed this

Eighteenth Day of January, 2005

JON W. DUDAS
*Director of the United States Patent and Trademark Office*